(12) United States Patent
Fujino

(10) Patent No.: US 7,319,676 B2
(45) Date of Patent: Jan. 15, 2008

(54) GPRS NETWORK SYSTEM

(75) Inventor: Shozo Fujino, Tokyo (JP)

(73) Assignee: NEC Corporation, Tokyo (JP)

( * ) Notice: Subject to any disclaimer, the term of this patent is extended or adjusted under 35 U.S.C. 154(b) by 1072 days.

(21) Appl. No.: 10/370,269

(22) Filed: Feb. 20, 2003

(65) Prior Publication Data

US 2003/0174689 A1   Sep. 18, 2003

(30) Foreign Application Priority Data

Mar. 4, 2002   (JP) .............................. 2002-056743

(51) Int. Cl.
*H04Q 7/38*   (2006.01)
(52) U.S. Cl. ...................................... 370/254; 370/338
(58) Field of Classification Search ................ 370/254, 370/255, 338, 352
See application file for complete search history.

(56) References Cited

U.S. PATENT DOCUMENTS

| | | | | |
|---|---|---|---|---|
| 6,839,561 | B2 * | 1/2005 | Kato | 455/461 |
| 2006/0258352 | A1 * | 11/2006 | Ishii | 455/435.1 |

FOREIGN PATENT DOCUMENTS

| | | |
|---|---|---|
| JP | 3-6931 | 1/1991 |
| JP | 8-182037 | 7/1996 |
| JP | 10-304425 | 11/1998 |
| JP | 2000-503825 | 3/2000 |
| JP | 2000-201172 | 7/2000 |
| JP | 2001-508970 | 7/2001 |
| JP | 2001-508971 | 7/2001 |
| JP | 2001-517910 | 10/2001 |
| JP | 2003-520519 | 7/2003 |
| JP | 2003-534714 | 11/2003 |
| WO | WO 97/26739 | 7/1997 |
| WO | WO 98/32299 | 7/1998 |
| WO | WO 98/32303 | 7/1998 |
| WO | WO 99/41928 | 8/1999 |
| WO | WO 00/78066 A1 | 12/2000 |
| WO | WO 01/52569 | 7/2001 |
| WO | WO 01/91370 A2 | 11/2001 |

OTHER PUBLICATIONS

ETSI TS 123 060 V3.6.0, XX, XX, Jan. 2001, pp. 1-184, XP002198494.

* cited by examiner

*Primary Examiner*—Melvin Marcelo
(74) *Attorney, Agent, or Firm*—Muirhead and Saturnelli, LLC

(57) ABSTRACT

A general packet radio service (GPRS) system includes radio network controllers (RNC), support nodes (SGSN) and a gateway node (GGSN) connected in a hierarchical order for packet transmission between mobile stations in the system. Each of each RNC, each SGSN and GGSN has a communication path controller to return the request of coupling toward subordinate node or controller if the subordinate mobile stations include the destination mobile station. Accounting for the packet service is based on the return of the packets.

18 Claims, 8 Drawing Sheets

GPRS NETWORK SYSTEM

BACKGROUND OF THE INVENTION (a) Field of the Invention

The present invention relates to a GPRS (general packet radio service) network system and, more particularly, to a GPRS network system which is capable of mobile communication without significantly modifying the structure of the current GPRS network system while adding some interfaces, for example, thereto.

The present invention also relates to a mobile communication method used in such a GPRS network system.

(b) Description of the Related Art

GPRS is known as a packet switching service using a GSM (global system for mobile communication) backbone network. The GSM network system is a digital cellular phone system prescribed in the unified European telecommunication standard.

The techniques for the telecommunication system used in the GPRS network system are described in JP-A-2000-201172 and PCT domestic publication 2001-517910, for example. Other PCT domestic publications 2000-503825, 2001-508970 and 2001-508971 also describe techniques for the GPRS communication networks.

FIG. 8 shows a block diagram of a typical communication system using the conventional GPRS system, wherein a public land mobile network (PLMN) 300 and an IP network 200 are depicted. A plurality of base stations (not shown in the drawing) in the PLMN 300 are connected to one of the higher-order-node radio network controllers (RNC) 55 to 58, and communicate with subordinate mobile stations such as mobile stations 59 and 60, i.e., mobile stations staying within the cellular area of the base station and thus belonging to the base station. Each radio network controller RNC constitutes a starting point and a terminal point of a GTP encapsulating using the GPRS tunneling protocol (GTP).

Principal nodes constituting the GPRS network 300 include two types of node including a support node SGSN (serving GPRS support node) as a lower-order node and a gateway node GGSN (gateway GPRS support node) as a higher-order node. These support node SGSN and gateway node GGSN have a function of relaying communication between a user terminal (or source mobile station) and a destination mobile station.

A support node SGSN 53 or 54 effects data transmission between the same and the mobile station such as 59 or 60 or a gateway node GGSN 52 in the PLMN 300. For example, a support node SGSN 53 collects up-link calls from the subordinate radio network controllers RNC 55 and 56 and distributes the down-link calls delivered from a superordinate gateway node GGSN 52 toward the subordinate radio network controllers RNC 55 and 56. The support node SGSN 53 manages a packet service between the same and the gateway node GGSN 52 by tunneling. The support nodes SGSN receive the subscriber data stored in a home location register (HLR) 51 and have therein at any time a copy thereof.

It should be noted that the public land mobile network (PLMN) 300 is one of communication areas under the control of a mobile communication carrier. It is usual that a large number of support nodes SGSN are provided in a PLMN 300; however, only two of the support nodes SGSN 53 and 54 are depicted in FIG. 8.

The home location register HLR 51 is a database node for storing subscriber data including registered location information of the mobile stations and accounting information thereof, and delivers a copy of the subscriber data to the support nodes SGSN 53 etc. upon request therefrom. More specifically, the home location register HLR 51 stores permanent subscriber data as to each of the mobile subscribers, such as including a mobile station ISDN number (MSISDN) which specifies a proprietary mobile subscription by using a PSTN numbering plan, and an international mobile subscriber identity (IMSI) which is a proprietary identity or ID allocated to each subscriber and used for identification during the signal transmission in the mobile network system.

The home location register HLR 51 also stores therein data including the current subscriber location number corresponding to the address of VLR (visitor location register) in service for the mobile subscriber and a list of the services allowed to the mobile subscriber. All the information for the subscriber with respect to the network is stored in the HLR 51 in relation to the IMSI of the subscriber. It should be understood that the location registry of each mobile station MS in the home location register HLR 51 is effected via the support node SGSN, the address of which is also stored as the SGSN address in the home location register HLR 51.

The gateway node GGSN 52 functions as a logical interface to an external data packet network such as an IP data network 200, and operates for coupling between networks 300 and 200. More specifically, the gateway node GGSN 52 collects up-link calls from the subordinate support nodes SGSN 53 and 54 and accesses the external IP data network 200. In FIG. 8, it is assumed that the IP network 200 is to be accessed at the gateway node GGSN 61 of the IP network 200 as an access point. The gateway node GGSN 52 in the GPRS network 300 sets up a tunnel down to the support nodes SGSN 53 and 54 for down-link calls.

It is noted that the specification for the current 3GPP (third-generation partnership project) is only directed to traffics wherein a mobile station either originates a call to a server or host computer within the internet or answers a call from the server or the host computer. That is, in the current 3GPP, there is no specification that prescribes the traffics between the mobile stations within the same GPRS network 300.

However, it is considered that a demand for communication occurs between mobile stations both residing within the same radio communication network, and in an extreme case, a demand for communication may occur between mobile stations staying within the same area of the radio communication network, such as within the same building.

Thus, as the present inventor considers, it is preferable that such a communication be performed within the same GPRS network. Particularly, considering that a mobile-to-mobile communication can be achieved by setting a return path at a node within the network, such a return path is especially preferable because reduction of the communication path or avoidance of congestion at the gateway node GGSN is obtained. For this purpose, it is desirable to add some architecture in the scheme of the 3GPP system of the GPRS configuration. This should be achieved as by adding a new-type node in the network without introducing a significant modification of the structure in the system, which raises the development costs or implementation costs.

SUMMARY OF THE INVENTION

In view of the above, it is an object of the present invention to provide a GPRS network system which is capable of reducing burden on the network system and the account of the mobile stations without a significant modification of the structure in the current GPRS system, especially in the case of a mobile-to-mobile communication.

The present invention provides in one aspect thereof a general packet radio service (GPRS) network system including: a gateway node (GGSN) having a function for coupling the GPRS network system to an external packet data network for packet transmission; a plurality of support nodes (SGSN) each subordinate and connected to the gateway node for packet transmission; a plurality of radio network controllers (RNC) each subordinate and connected to one of the support nodes for packet transmission, each the radio network controller having a subordinate radio network; a plurality of mobile stations each coupled to the cellular node of one of the radio network controllers; and a home location register (HLR) for storing current location information of the mobile stations in conjunction with ID thereof, wherein at least one of the GGSN, each the SGSN and each the RNC includes a transmitter for directly transmitting to the home location register current location information supplied from one of the mobile stations, a receiver for directly receiving the current location information of a specified one of the mobile stations stored in the home location register, and a communication path controller for transferring a packet of a coupling request delivered from a source mobile station through a forward path to a higher-order node or through a return path to a subordinate node, controller or radio network.

The present invention also provides in another aspect thereof a method for communicating packets between mobile stations in a general packet radio service (GPRS) network system, wherein a plurality of radio network controllers (RNC) each controlling own radio network, a plurality of support nodes (SGSN) and a gateway node (GGSN) are connected in a hierarchical order for packet transmission and wherein a home location register (HLR) stores current location information of mobile stations used in the network system, the method comprising the steps of: allowing the HLR to deliver location information of a destination mobile station to one of the GGSN, each the SGSN and each the RNC upon occurrence of a request for coupling from a source mobile station; allowing the one of the GGSN, each the SGSN and each the RNC to judge whether or not mobile stations subordinate to the one of the GGSN, each the SGSN and each the RNC includes the destination mobile station; allowing the one of the GGSN, each the SGSN and each the RNC to transfer the request to a higher-order node or return the request to a lower-order node or controller or own network based on the judgement in the judging step; and accounting the request for coupling based on transfer or return of the request.

In accordance with the GPRS network system and the method of the present invention, when a return path is formed in the GPRS network, the costs for the communication can be reduced and congestion of the traffics at the higher-order nodes above the node at which the return path is formed for the packets can be avoided

PREFERRED EMBODIMENT OF THE INVENTION

Figure 1:
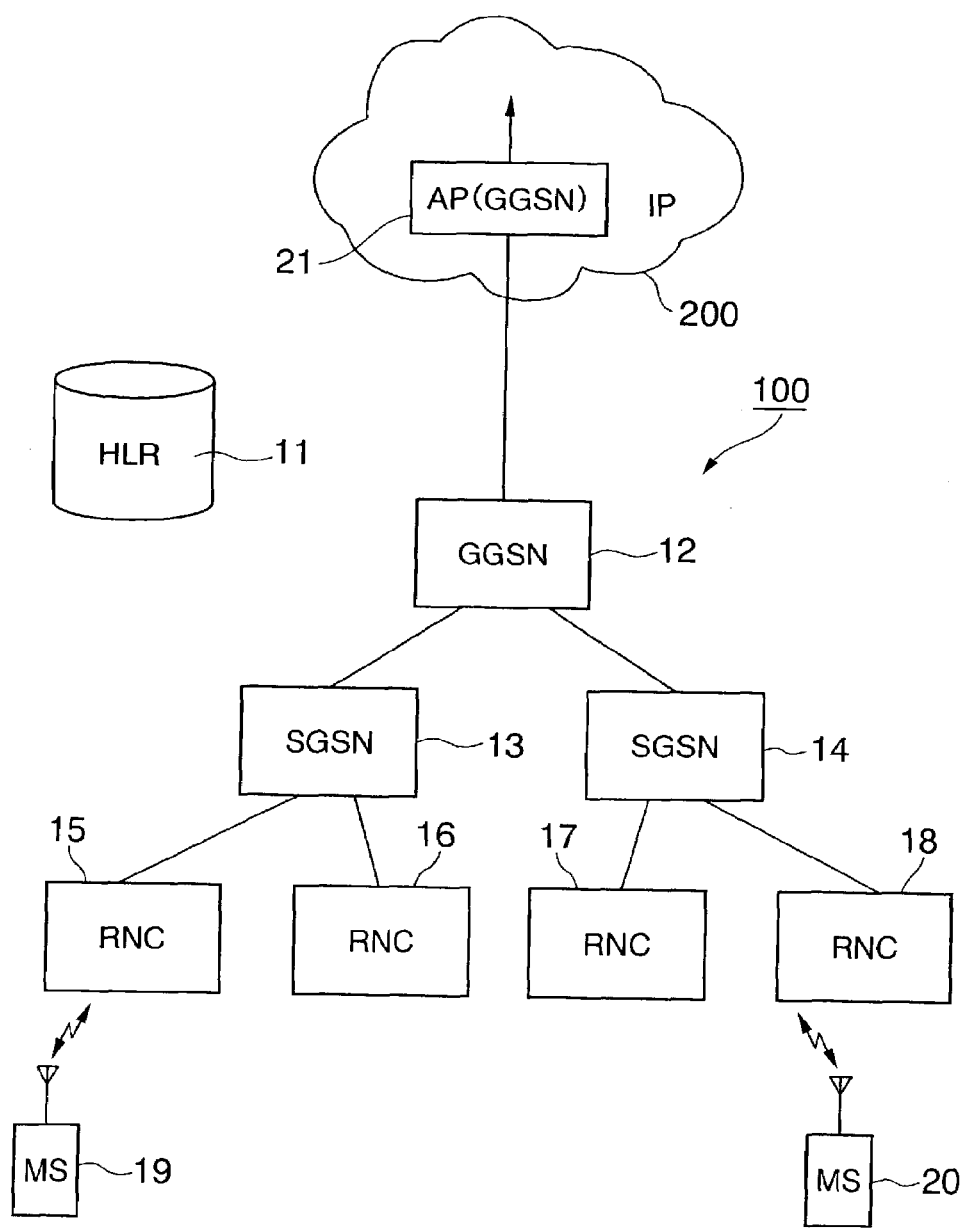
FIG. 1 is a block diagram of a GPRS network system according to an embodiment of the present invention.

Now, the present invention is more specifically described based on an embodiment thereof with reference to accompanying drawings. Referring to FIG. 1, a GPRS network system, generally designated by numeral 100, according to the embodiment of the present invention includes a home location register (HLR) 11, a gateway node (gateway GPRS support node: GGSN) 12, support nodes (serving GPRS support nodes: SGSN) 13 and 14, radio network controllers (RNC) 15 to 18, and a plurality of mobile stations such as mobile stations 19 and 20, which are connected in a hierarchical connection scheme. The GPRS network system 100 includes a large number of other nodes and a large number of other mobile stations which are not specifically shown in FIG. 1.

The home location register HLR 11 includes a communication equipment for directly communicating with the gateway node GGSN 12, support nodes SGSN 13 and 14 and radio network controllers RNC 15 to 18. More specifically, the home location register HLR 11 includes a receiver for directly receiving from the radio network controllers RNC 15 to 18 the location information of all the mobile stations such as 19 and 20, which belong to the radio network controllers 15 to 18, as well as receiving a request of such information from these nodes, and a transmitter for directly transmitting such information requested by the nodes including RNC.

The home location register HLR 11 stores therein location information including the international mobile subscriber ID (IMSI) and the IP addresses of each subscriber. The home location register HLR 11 also stores therein subscription data including the "SGSN address in use" for each mobile station which the conventional HLR stores therein. The subscription data in the HLR 11 in the network system 100 of the embodiment additionally includes the "RNC addresses in use" and "GGSN address in use" for each mobile station. The home location register HLR 11 delivers these location data upon request thereof directly to the gateway node GGSN 12, the support nodes SGSN 13 and 14 and radio network controllers RNC 15 to 18.

The "RNC address in use" is a current RNC address of the mobile station, i.e., the address of the radio network controller RNC to which the mobile station belongs, and is stored in the home location register HLR 11 by the mobile station at the registry or update of the location of the mobile station. Similarly, the "GGSN address in use" is a current GGSN address of the mobile station stored in the home location register HLR 11 by the mobile station at the location registry or update thereof.

The radio network controller RNC 15 to 18 collects up-link calls from the subordinate base stations belonging to the radio network controllers RNC 15 to 18. Each RNC constitutes a starting point and a terminal point of a GTP (GPRS tunneling protocol) encapsulating. Each RNC in the embodiment includes a communication path control block and an interface, i.e., communication block for communicating with the home location register HLR 11. More specifically, the RNC includes a transmitter for transmitting the location registry data for the mobile stations (user terminals), which belong to the subordinate network of the RNC, to the HLR 11, and a receiver for receiving registered location information from the HLR 11. The communication path control block allows a packet to be forwarded through a forward path to a higher-order node or to be turned backward through a return path to a lower-order node.

The radio network controller RNC has a PDP context (packet data protocol) as call control information, the PDP context including a destination table used for communication between mobile stations. The PDP context in the present embodiment also includes a packet counter for counting the packet data to be turned back and a flow meter for measuring the amount of the packet data, whereby the PDP context accounts the packets turned back through the return path and bill the subscriber for the packet service. The RNC also has other data functions which the conventional RNC generally have.

Each of the support nodes SGSN 13 and 14 functions as a packet data service node and relays GTP packets between the subordinate radio network controllers RNC and the superordinate gateway node GGSN. The support node SGSN collects up-link calls from the subordinate radio network controllers RNC. The SGSN includes a mobility management context (MM context) as subscriber data, and an interface or communication equipment for communicating with the home location register HLR 11. More specifically, the SGSN includes a transmitter for transmitting a request for registered location information of a specified mobile station to the home location register HLR 11, and a receiver for receiving the registered location information of the specified mobile station from the HLR 11. The support node SGSN also includes a communication path control block which enables a request for coupling to be turned backward at the own node, and stores a destination table for communication between the mobile stations in the PDP context, i.e., call control information. The support node SGSN also has other functions, which the conventional support nodes SGSN generally have.

The gateway node GGSN 12 functions as a gateway between the radio access network 100 and the internet 200 in the present embodiment. The gateway node GGSN 12 collects up-link calls from the subordinate support nodes SGSN 13 and 14, and constitutes a starting point and a terminal point for a GTP encapsulating.

The gateway node GGSN 12 includes, as a communication interface, a transmitter for transmitting a request for registered location information of a specified mobile station to the home location register HLR 11 and a receiver for receiving the registered location information of the specified mobile station from the HLR 11. The GGSN 12 includes a destination table for communication between the mobile stations in the PDP context. The GGSN 12 also includes a communication path control block which is capable of turning backward a request for coupling at the own node, and a MM context as subscriber data.

The mobile station MS includes a transmitter and a receiver for performing radio communication with the radio network controller RNC via the base station (not shown). The mobile station has a global IP address and receives an external request for coupling therewith by using the global IP address.

The specified functions of each node including the RNC and the mobile stations may be implemented by hardware configurations in the communication system of the present embodiment as described above. However, these functions may be preferably implemented by software using computer programs having respective functions and loaded on a memory of a computer or processor. The computer programs are generally stored in a storage media such as a magnetic disk or semiconductor memory. Those functions are implemented by loading the computer programs on the processor from the storage media and running the processor on the computer programs.

Figure 2:
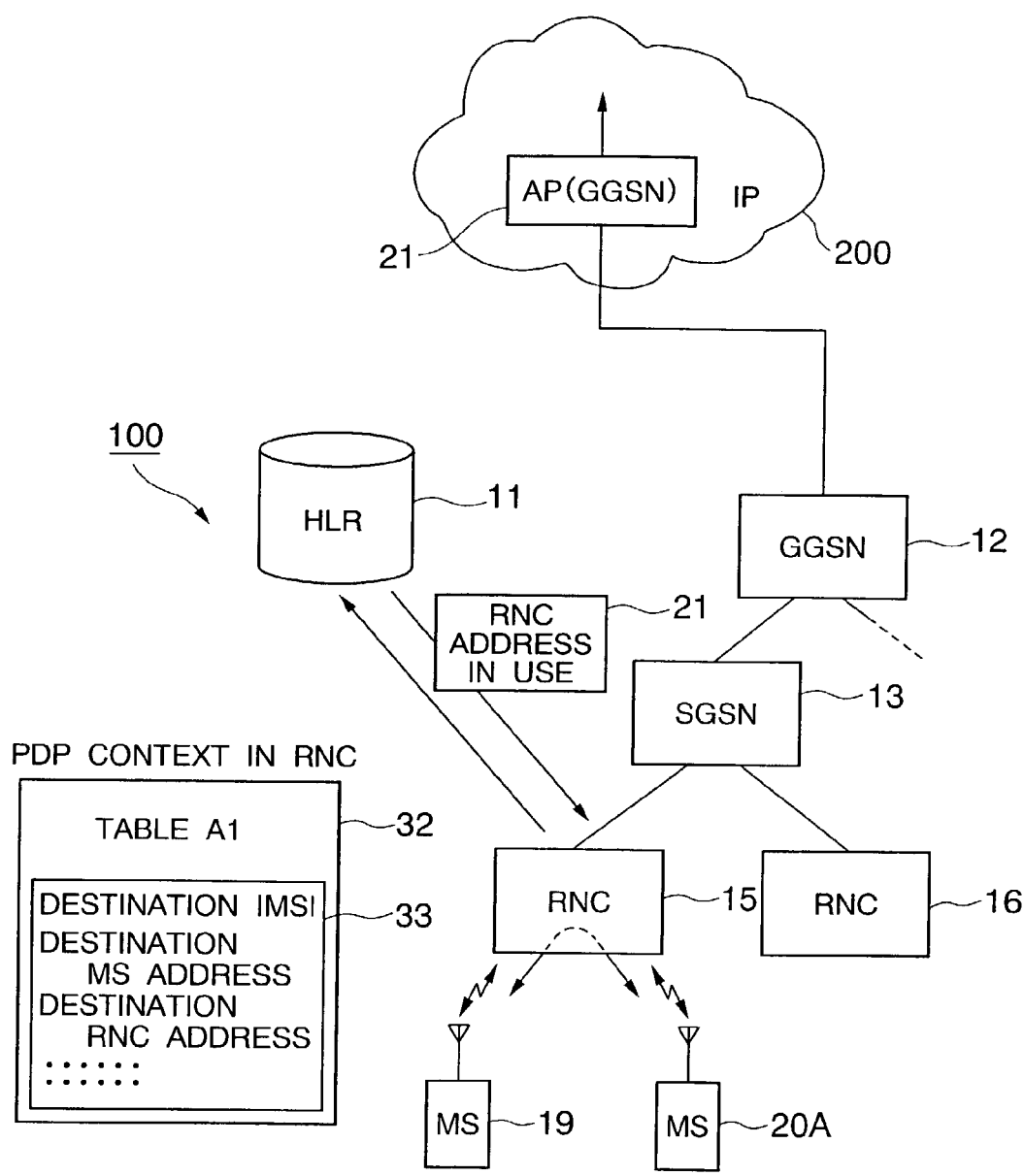
FIG. 2 is an explanatory diagram showing data flows during a return operation at the radio network controller RNC in the GPRS network system of FIG. 1.
Figure 3:
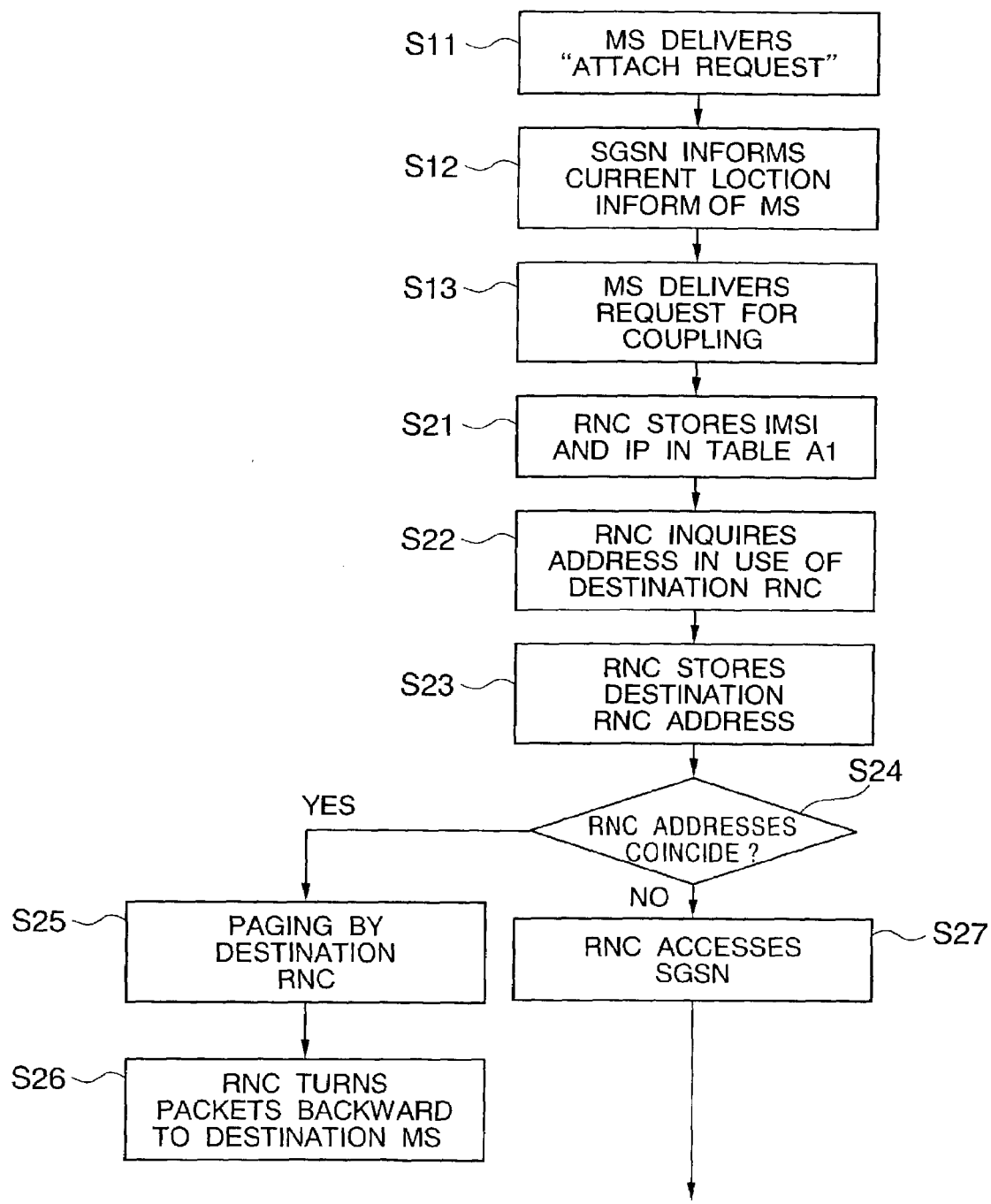
FIG. 3 is a flowchart of operation of the mobile station and a radio network controller RNC in the GPRS network system of FIG. 1.

Communication between the mobile stations in the communication system 100 by using a return path at the radio network controller RNC will be described with reference to FIG. 2 showing the packet flows in the system and FIG. 3 showing the flowchart of the mobile station and the radio network controller RNC. It is assumed that the source mobile station 19 is to transmit packets to the destination mobile station 20A, both belonging to the nodes or cellular network subordinate to the same RNC 15.

The packet service is provided by the communication system 100 in the case wherein the destination mobile station is a GPRS subscriber having an international mobile subscriber ID (IMSI). First, each mobile station attempts to register the location hereof, i.e., requests registry of the location thereof upon power ON thereof. In this example, after the source mobile station 19, for example, transmits a GTP control message "attach request" to the corresponding radio network controller 15 (step S11), the higher-order support node SGSN 13 delivers notification of the current location of the mobile station 19 to the home location register HLR 11 (step S12), which registers therein the current location information of the mobile station 19.

If the mobile station 19 transmits a request for coupling before packet transmission in step S13, the corresponding radio network controller RNC 15 stores the IMSI and IP address of the destination of the coupling request in the destination table A1 of the PDP context in the RNC 15 (step S21).

The radio network controller RNC 15 then delivers to the home location register HLR 11 an inquiry of the IP address of the radio network controller RNC 18, to which the destination mobile station 20A belongs, based on the destination IMSI as a key (step S22). The RNC 15 then receives the destination RNC address from the home location register HLR 11, and stores the received destination RNC address in the destination table A1 (step S23).

The radio network controller 15 then judges whether or not the destination RNC address coincides with the source RNC address, i.e., the address of the RNC 15 to which the source mobile station 19 belongs, based on the destination table A1 (step S24). If it is judged in step S24 that the destination RNC address coincides with the source RNC address, the radio network controller 15 delivers paging for the destination mobile station 20A through the subordinate network (step S25). Subsequently, the source mobile station 19 delivers data packets toward the destination mobile station 20A.

The radio network controller RNC 15 turns the data packets delivered from the source mobile station 19 toward the subordinate network to deliver the data packets to the destination mobile station 20A in the network (step S26). Each radio network controller RNC in the present embodiment has an accounting device and a flow meter in the PDP context A1 for accounting the data packets subjected to a return service.

If it is judged in step S24 that the destination RNC address does not coincide with the RNC IP address of the source mobile station 19, the radio network controller 15 transfers the packet of request through a forward path toward the higher-order support node SGSN 13.

Figure 4:
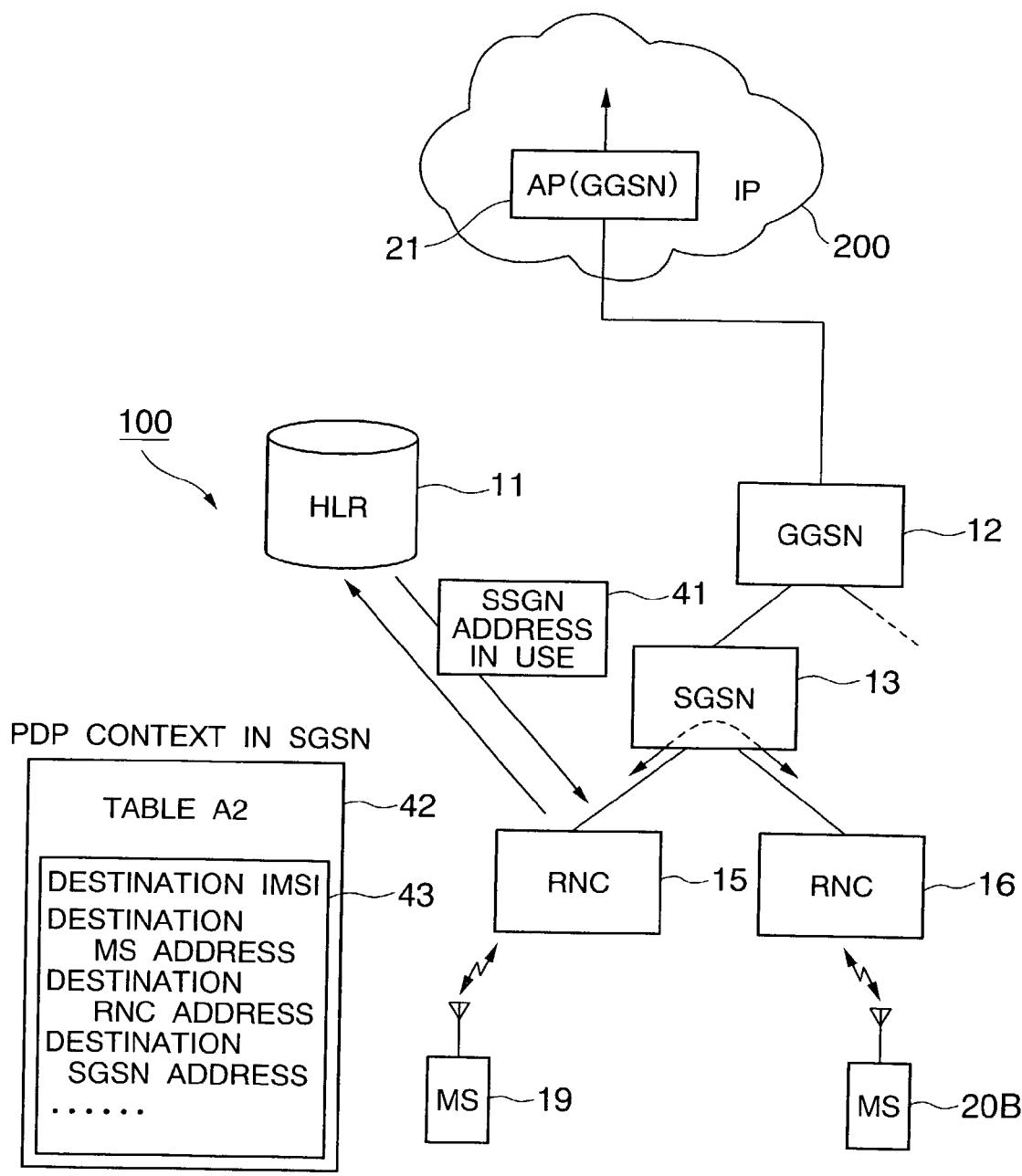
FIG. 4 is an explanatory diagram showing data flows during a return operation at the support node SGSN in the GPRS network system of FIG. 1.
Figure 5:
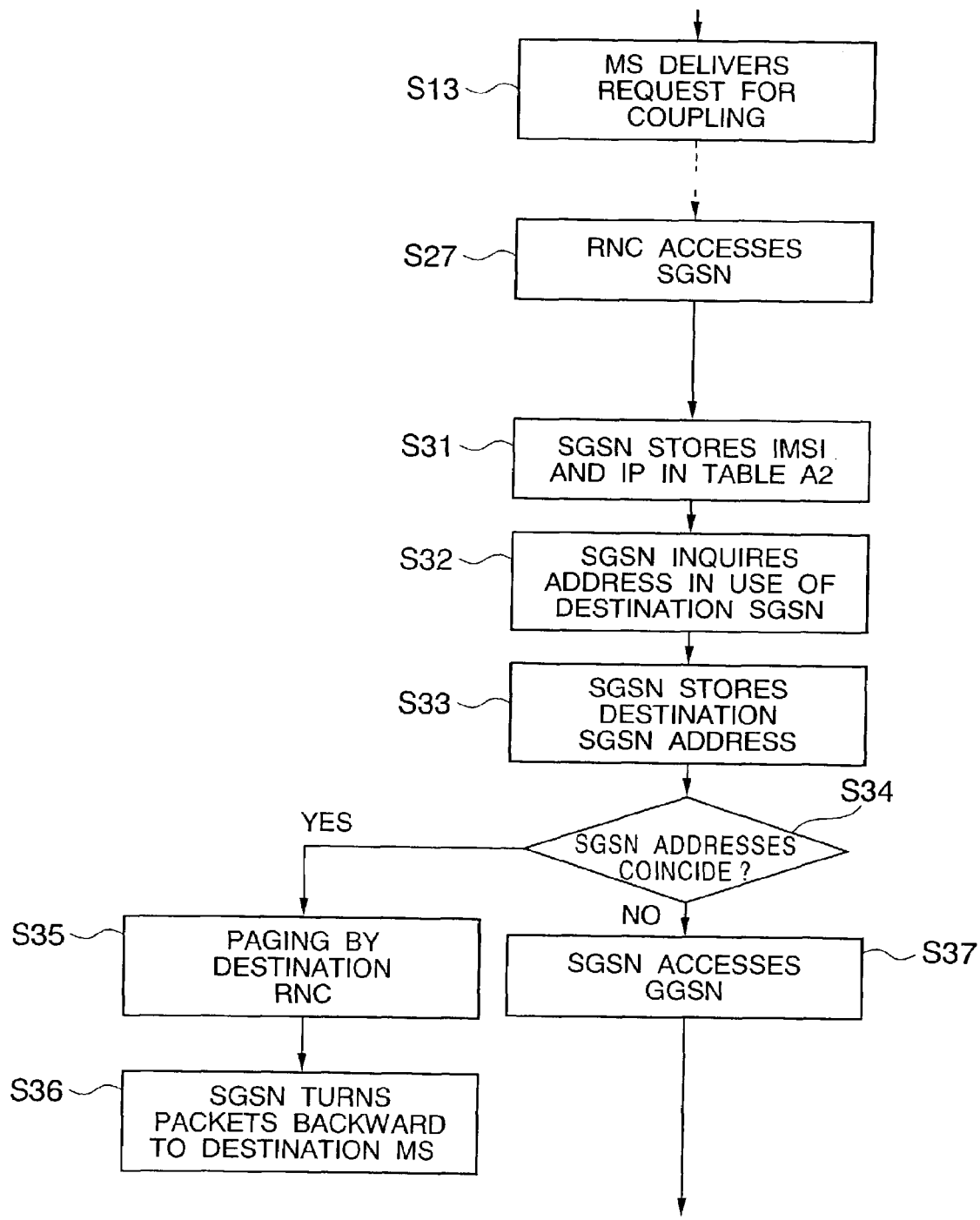
FIG. 5 is a flowchart of the support node SGSN in the GPRS network system of FIG. 1.

FIGS. 4 and 5 show packet flows and a flowchart, respectively, in the case of packet return at the support node SGSN. It is assumed in this case that the mobile station 19 belonging to the radio network controller RNC 15 is to deliver data packets toward the destination mobile station 20B belonging to another radio network controller 16 having the common higher-order support node SGSN 13.

In the case of packet return at the support node SGSN, steps S11, S12, and S21 to S24 are similar to those in the case of the packet return at the radio network controller RNC, and thus the flowchart of FIG. 5 includes these steps S11, S12, and S21 to S24 although these steps are omitted for depiction in FIG. 5.

The source mobile station 15 first delivers a request for coupling with the destination mobile station 20B before the data packet transmission (step S13). If it is judged by the radio network controller RNC 15 in step S24 that the destination RNC address does not coincide with the RNC IP address of the source mobile station 19, the RNC 15 understands that the destination mobile station 20B belongs to another radio network controller RNC. Thus, the RNC 15 attempts to access the higher-order support node SGSN 13 in step S27.

The higher-order support node SGSN 13 makes a copy of the destination table A1 in the radio network controller 15 and stores the copy as the own destination table A2 in the PDP context of the support node SGSN 13 (step S31). The support node SGSN 13 then delivers an inquiry of the SGSN address of the destination mobile station to the home location register HLR 11 based on the destination IMSI as a key (step S32). The support node SGSN 13 then receives the destination SGSN address in use from the home location register HLR 11 and stores the same as a destination SGSN address in the own destination table A2 (step S33).

Subsequently, the support node SGSN 13 delivers a message "create PDP context request" to the radio network controller RNC 16, thereby creating a GTP tunnel on the destination side. The tunnel in this direction is not prescribed in the 3GPP specification. Then, the source mobile station 19 delivers data packets, which are received by the support node SGSN 13 via the radio network controller RNC 15 and turned back at the support node SGSN 13. The data packets thus returned are delivered through the return path to the destination mobile station 20A via the radio network controller 16 (step S36). The accounting for the data packets is effected for the case of the packet return service.

Figure 6:
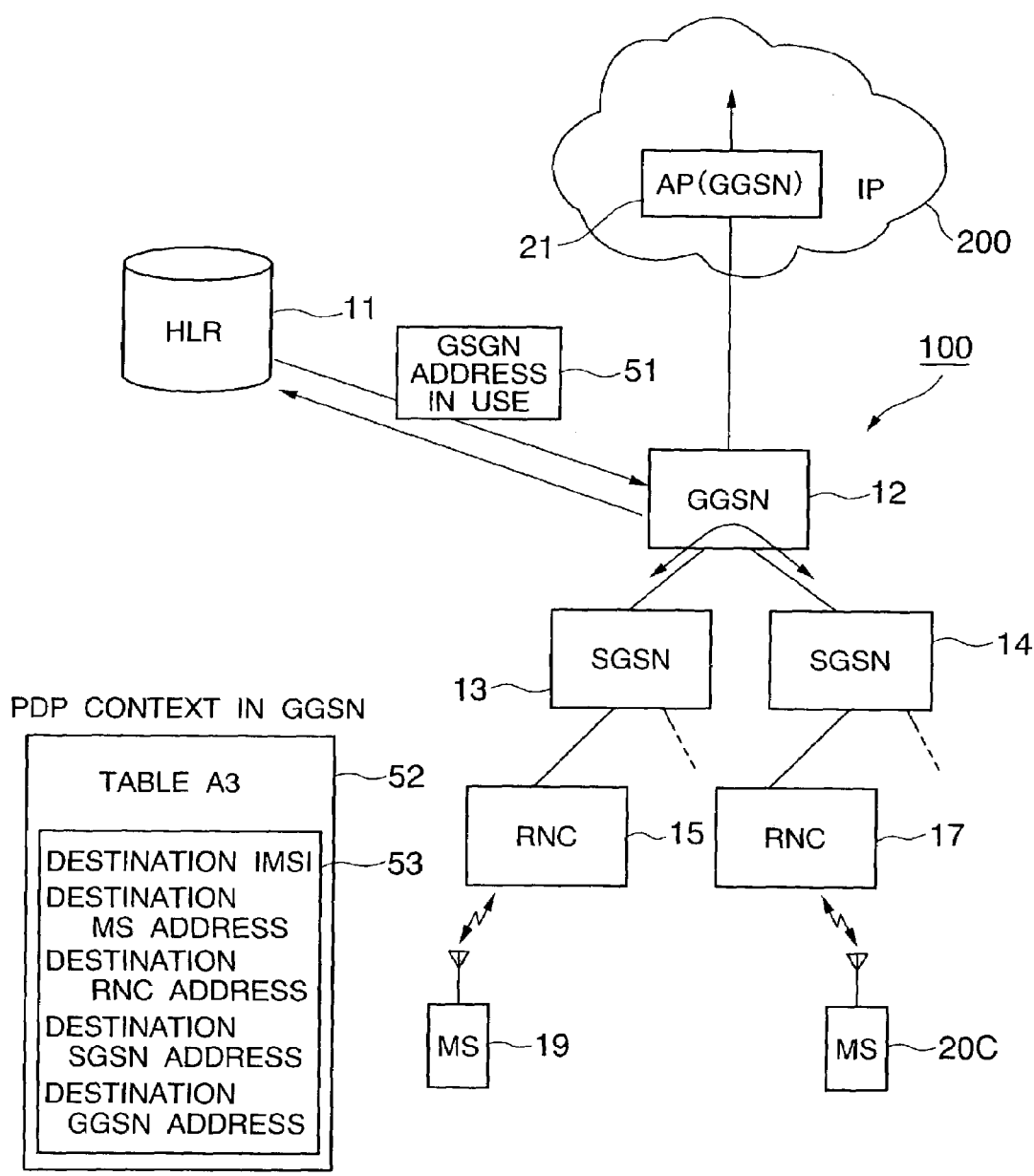
FIG. 6 is an explanatory diagram showing data flows during a return operation at the gateway node GGSN in the GPRS network system of FIG. 1.

If it is judged in step S34 that the destination SGSN address does not coincide with the SGSN IP address of the support node to which the source mobile station 19 belongs, the support node SGSN 13 transfers the packet of request through the forward path toward the higher-order gateway node GGSN 12 (step S37). This case, i.e., packet return at the gateway node GGSN will be described hereinafter with reference to FIGS. 6 and 7.

It is assumed in this case that the source mobile station 19 is to deliver data packets to the destination mobile station 20C belonging to a radio network controller RNC 17 which is subordinate to another support node SGSN 14.

Figure 7:
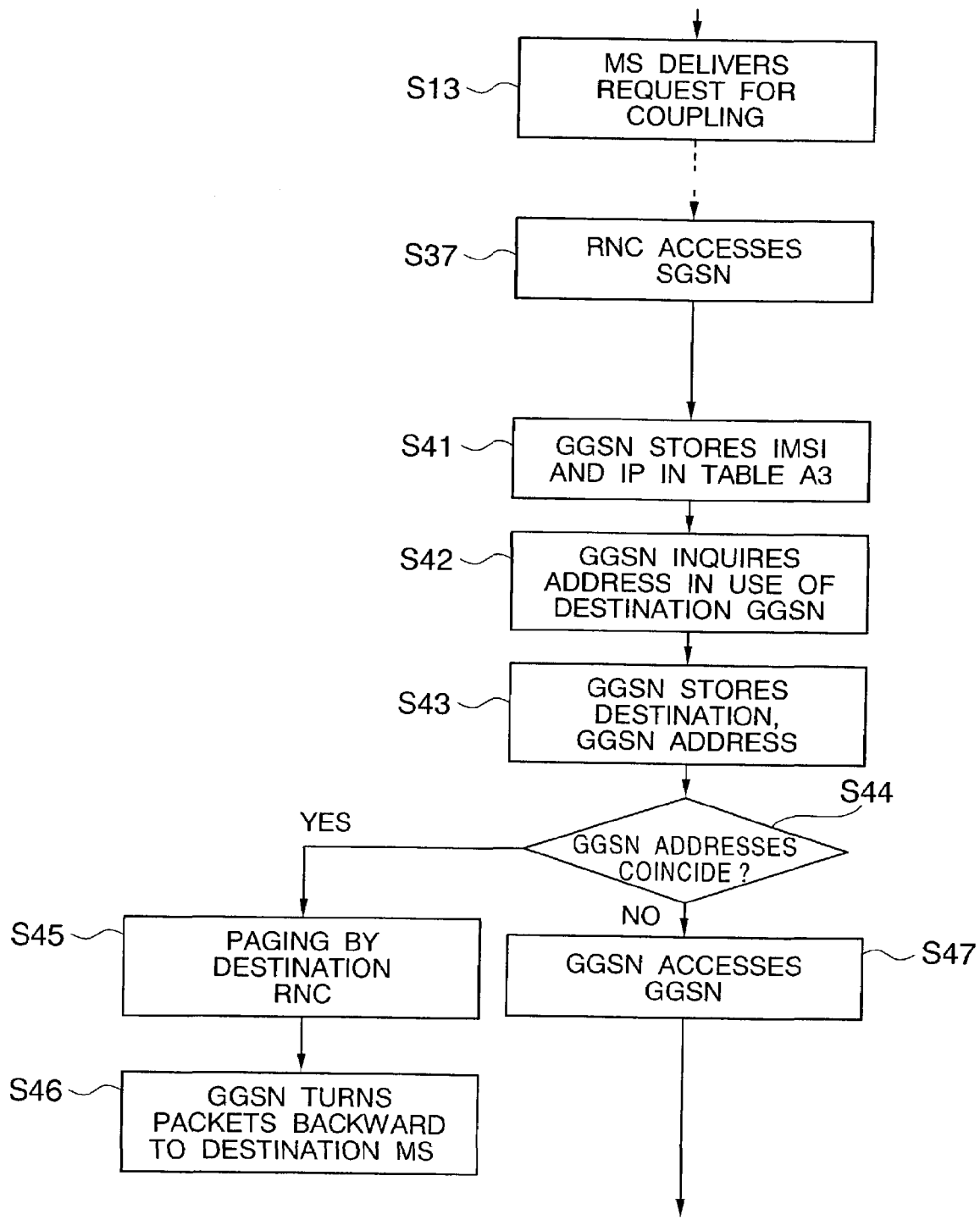
FIG. 7 is a flowchart of the gateway node GGSN in the GPRS network system of FIG. 1.
Figure 8:
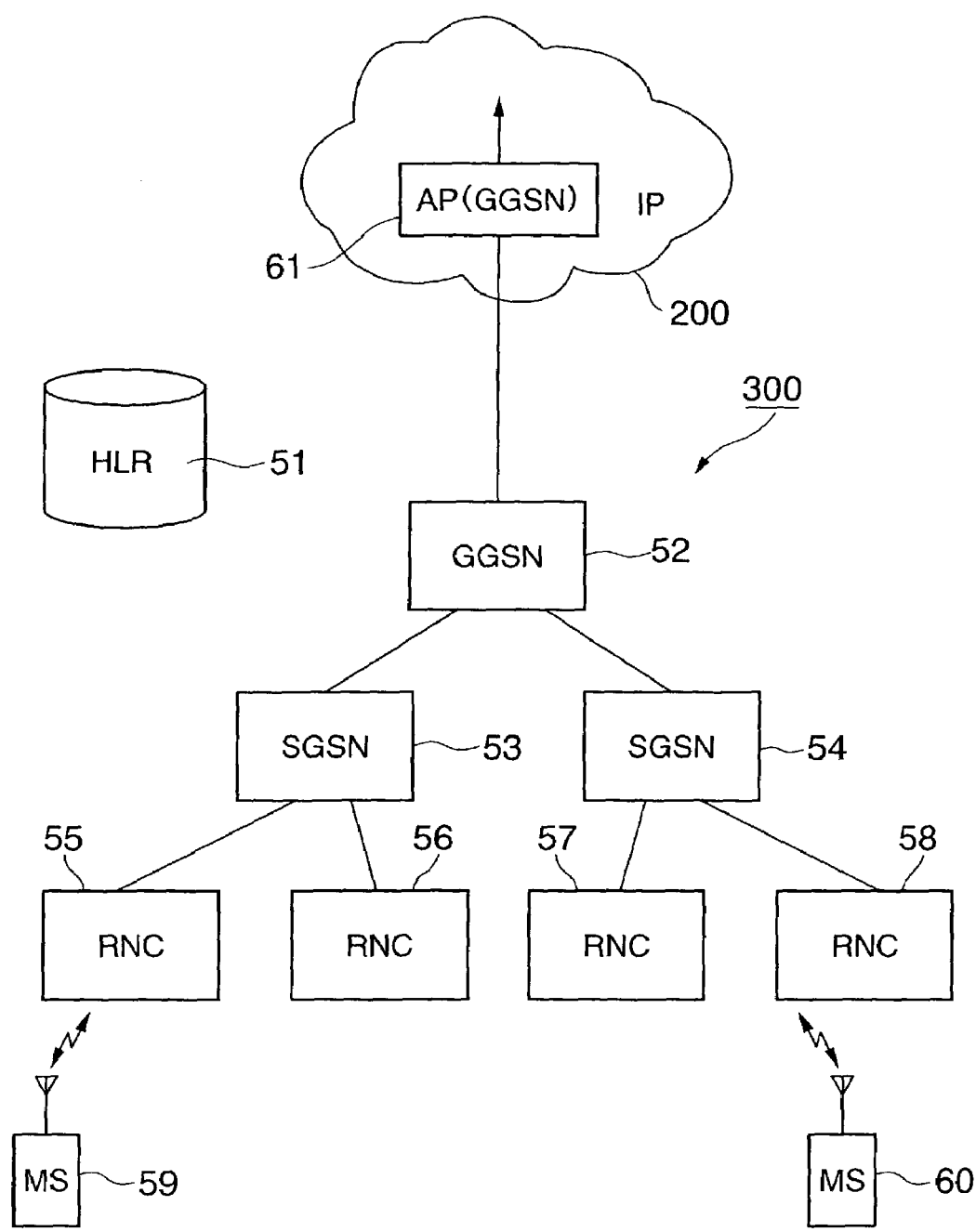
FIG. 8 is a block diagram of a typical communication system using the conventional GPRS.

In the case of return at the gateway node GGSN, the steps S11, S12, S21 to S24 and S31 to 34 are similar to those in the case of return at the support node SGSN, and omitted for depiction in FIG. 7. After the source mobile station 19 delivers a request for coupling (step S13) and the support node SGSN 13 recognizes that the destination SGSN address does not coincide with the SGSN IP address of the support node SGSN 13 to which the source mobile station 19 belongs (step S34), the support node SGSN 13 attempts to access the higher-order gateway node GGSN 12 (step S37).

The gateway node GGSN 12 makes a copy of the destination table A2 in the support node SGSN 13 and stores the copy in the PDP context as the own destination table A3. The destination table A3 so far includes the destination IMSI, destination mobile station IP address, and destination SGSN IP address. The gateway node GGSN 12 delivers an inquiry of the GGSN address in use" to the home location register 11 based on the destination IMSI as a key (step S42). The gateway node GGSN 12 receives the GGSN address in use and stores the same in the own destination table A3 as the destination GGSN address (step S43).

The gateway node GGSN 12 then judges whether or not the destination GGSN address coincides with the source GGSN address of the gateway node 12 to which the source mobile station 19 belongs (step S44). If it is judged in step S44 that the destination GGSN address coincides with the source destination GGSN address, the gateway node GGSN 12 accesses the radio network controller 17 based on the destination RNC address and the destination SGSN address.

Thus, the radio network controller RNC 17 accessed by the gateway controller GGSN 12 delivers a paging through the subordinate network for the destination mobile station. Subsequently, a message "create PDP context request" is delivered through the radio network controller RNC 15 and support node SGSN 13 to the gateway node GGSN 12, thereby creating a GTP tunnel on the source side.

Then, a message "create PDP context request" is delivered from the radio network controller RNC 15 through the gateway node GGSN 12 to the support node SGSN 14, thereby creating a GTP tunnel on the destination side. The creation of the tunnel in this direction is not prescribed in the current 3GPP specification.

Subsequently, the source mobile station 19 transmits data packets, which are delivered through the radio network controller RNC 15 and support node SGSN 13 to the gateway node GGSN 12, and turned back at the gateway node GGSN 12. The returned packets are then delivered through the return path, i.e., through the support node SGSN 14 and the radio network controller RNC 17 to the destination mobile station 20C (step S46). The accounting for the packets is effected for the case of the packet return service.

If it is judged in step S44 that the destination GGSN address does not coincide with the source GGSN IP address of the gateway node GGSN 12 to which the source mobile station 19 belongs, the gateway node GGSN 12 transfers the packet delivered from the source mobile station 19 to the destination GGSN address, such as the address of the GGSN 21 in the IP network 200 (step S47). It is to be noted that a plurality of gateway nodes GGSN may be provided in a single network system, although a single gateway node is depicted in the network system of FIG. 1. In such a system, the gateway node GGSN to which the source mobile station belongs transfers the packet to another gateway node GGSN, which returns the packet within the network.

As will be understood from the above description, the nodes in the GPRS network system of the embodiment have the functions as described below.

The home location register HLR stores therein information of each subscriber including the IMSI and IP address thereof, as well as the GGSN address in use, SGSN address in use and RNC address in use of the each subscriber, updating these data upon receiving such information.

The radio network controller RNC transmits the location registry data of subordinate mobile stations to the home location register HLR, buffers the packet of a request for coupling upon occurrence of the request from a source mobile station, and directly obtains the location information of the registered destination mobile station from the HLR. The RNC judges whether or not the destination mobile station belongs to the subordinate network based on the registered location information of the destination mobile station delivered from the home location register HLR. The RNC couples the communication path to the destination mobile station if it belongs to the subordinate network, whereas the RNC transfers the request for the coupling through the forward path to the higher-order support node SGSN if the destination mobile station belongs to the network of another RNC.

The support node SGSN buffers the packet of the request for coupling after the radio network controller RNC transfers the request delivered from the source mobile station. The SGSN obtains the registered location information of the destination mobile station directly from the home location register HLR. The SGSN judges whether or not the "SGSN address in use" coincides with the own SGSN address based on this registered location information. The SGSN couples the communication path to the destination radio network controller RNC if the destination SGSN address coincides with the own SGSN address, whereas the SGSN transfers the request through the forward path to the higher-order gateway node GGSN if the destination SGSN address does not coincide with the own SGSN address.

The gateway node GGSN buffers the packet of the request for coupling after the radio network controller RNC transfers through the support node SGSN the request delivered from the source mobile station. The GGSN obtains the registered location information of the destination mobile station directly from the home location register HLR. The GGSN judges whether or not the "GGSN address in use" coincides with the own GGSN address based on this registered location information. The GGSN couples the communication path to the destination SGSN address if the destination GGSN address coincides with the own GGSN address, whereas the GGSN transfers the request to the destination GGSN address if the destination GGSN address does not coincide with the own GGSN address.

It should be noted that the paging may be effected by the radio network controller RNC to which the destination mobile station belongs after the data packets are transmitted to the destination RNC, although the data packets are transmitted after the paging in the above embodiment.

In the above embodiment, each of the nodes GGSN, SGSN and RNC includes a path control block having a function of forming a return path. However, a specified node or specified nodes of them may have such a function, whereas the remaining nodes or node do not have such a function. For example, the radio network controller RNC may be a conventional one, and the support nodes SGSN and/or gateway nodes GGSN may turn back the packets at the own nodes. In this case, the support node and/or the gateway node may directly deliver the location registry information of the own mobile stations. In an alternative, only the radio network controller RNC may have such a return function. In addition, a base station subordinate to a radio network controller RNC may have such a return function and directly access the home location register.

In the above embodiment, each mobile station delivers a GTP control message "attach request" to the radio network controller RNC to which the each mobile station belongs, and the higher-order support node SGSN delivers the location information of the each mobile station directly to the home location register HLR. This configuration can be achieved by modifying the conventional location registry scheme so that the support node SGSN extracts the "GGSN address in use" and "RNC address in use" and informs these addresses in use together with the own SGSN address in use to the home location register.

Since the above embodiments are described only for examples, the present invention is not limited to the above embodiments and various modifications or alterations can be easily made therefrom by those skilled in the art without departing from the scope of the present invention.

What is claimed is:

1. A general packet radio service (GPRS) network system comprising:
   a gateway node (GGSN) having a function for coupling said GPRS network system to an external packet data network for packet transmission;
   a plurality of support nodes (SGSN) each subordinate and connected to said gateway node for packet transmission;
   a plurality of radio network controllers (RNC) each subordinate and connected to one of said support nodes for packet transmission, each said radio network controller having a subordinate cellular network;
   a plurality of mobile stations each coupled to said cellular network of one of said radio network controllers; and
   a home location register (HLR) for storing current location information of said mobile stations in conjunction with ID thereof, wherein:
   at least one of said GGSN, each said SGSN and each said RNC includes a transmitter for directly transmitting to said home location register current location information delivered from one of said mobile stations, a receiver for directly receiving said current location information of a specified one of said mobile stations stored in said home location register, and a communication path controller for transferring a packet of a coupling request delivered from a source mobile station through a forward path to a higher-order node or through a return path to a subordinate node, controller or cellular network.

2. The GPRS network system according to claim 1, wherein said at least one of said GGSN, each said SGSN and each said RNC include all of said GGSN, said each SGSN and said each RNC.

3. The GPRS network system according to claim 1, wherein each of said GGSN and said each said SGSN receives, through a subordinate SGSN or a subordinate RNC, information of a destination mobile station delivered from said source mobile station.

4. The GPRS network system according to claim 1, wherein said communication path controller receives location information of a destination mobile station delivered from a subordinate node, radio network controller or cellular network, and receives additional location information of said destination mobile station directly from said home location register.

5. The GPRS network system according to claim 4, wherein said communication path controller judges whether or not said location information of said destination mobile station includes an address of own node, and transfers a packet through said forward path or said return path depending on the judgment.

6. The GPRS network system according to claim 5, wherein said communication path controller includes a packet counter and a data flow meter for accounting packets delivered through said return path.

7. A general packet radio service (GPRS) network system comprising:
- a gateway node (GGSN) having a function for coupling said GPRS network system to an external packet data network for packet transmission;
- a plurality of support nodes (SGSN) each subordinate and connected to said gateway node for packet transmission;
- a plurality of radio network controllers (RNC) each subordinate and connected to one of said support nodes for packet transmission, each said radio network controller having a subordinate cellular network;
- a plurality of mobile stations each coupled to said cellular network of one of said radio network controllers; and
- a home location register (HLR) for storing current location information of said mobile stations in conjunction with ID thereof, wherein:
- said RNC includes a transmitter for directly transmitting to said home location register current location information delivered from one of said mobile stations, a receiver for directly receiving said current location information of a specified one of said mobile stations stored in said home location register, and a communication path controller for transferring a packet of a coupling request delivered from a source mobile station through a forward path to a corresponding said SGSN or through a return path to a subordinate cellular network; and
- at least one of said GGSN and each said SGSN includes another receiver for directly receiving said current location information of said specified one of said mobile stations stored in said home location register, and another communication path controller for transferring the packet of the coupling request delivered from a source mobile station through a forward path to a higher-order node or through a return path to a subordinate node or controller.

8. The GPRS network system according to claim 7, wherein said at least one of said GGSN and each said SGSN include both of said GGSN and said each SGSN.

9. The GPRS network system according to claim 8, wherein each of said GGSN and said each said SGSN receives, through a subordinate SGSN or a subordinate RNC, information of a destination mobile station delivered from said source mobile station.

10. The GPRS network system according to claim 7, wherein each of said communication path controller and said another communication path controller receives location information of a destination mobile station delivered from a subordinate node, radio network controller or cellular network, and receives additional location information of said destination mobile station directly from said home location register.

11. The GPRS network system according to claim 10, wherein each of said communication path controller and said another communication path controller judges whether or not said location information of said destination mobile station includes an address of own node, and transfers a packet through said forward path or said return path depending on the judgment.

12. The GPRS network system according to claim 11, each of said communication path controller and said another communication path controller includes a packet counter and a data flow meter for accounting packets delivered through said return path.

13. A method for communicating packets between mobile stations in a general packet radio service (GPRS) network system, wherein a plurality of radio network controllers (RNC) each controlling own cellular network, a plurality of support nodes (SGSN) and a gateway node (GGSN) are connected in a hierarchical order for packet transmission and wherein a home location register (HLR) stores current location information of mobile stations used in the network system, said method comprising the steps of:
- allowing said HLR to deliver location information of a destination mobile station directly to one of said GGSN, each said SGSN and each said RNC upon occurrence of a request for coupling from a source mobile station;
- allowing said one of said GGSN, each said SGSN and each said RNC to judge whether or not mobile stations subordinate to said one of said GGSN, each said SGSN and each said RNC includes said destination mobile station;
- allowing said one of said GGSN, each said SGSN and each said RNC to transfer said request to a higher-order node or to return said request to a lower-order node or controller or own cellular network based on the judgement in said judging step; and
- accounting said request for coupling based on transfer or return of said request.

14. The method according to claim 13, wherein each of said GGSN and said each said SGSN receives, through a subordinate SGSN or a subordinate RNC, information of a destination mobile station delivered from said source mobile station.

15. The method according to claim 13, wherein a communication path controller receives location information of a destination mobile station delivered from a subordinate node, radio network controller or cellular network, and receives additional location information of said destination mobile station directly from said home location register.

16. The method according to claim 15, wherein said communication path controller judges whether or not said location information of said destination mobile station includes an address of own node, and transfers a packet through said forward path or said return path depending on the judgment.

17. The method according to claim 16, wherein said communication path controller includes a packet counter and a data flow meter for accounting packets delivered through said return path.

18. The method according to claim 15, wherein said communication path controller includes a packet counter and a data flow meter for accounting packets delivered through said return path.

* * * * *